(12) United States Patent
Tomita

(10) Patent No.: US 8,446,315 B2
(45) Date of Patent: May 21, 2013

(54) METHOD FOR PROVIDING SATELLITE ORBIT EPHEMERIS, SERVER, AND POSITIONING SYSTEM

(75) Inventor: Kyoichi Tomita, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 273 days.

(21) Appl. No.: 12/484,634

(22) Filed: Jun. 15, 2009

(65) Prior Publication Data

US 2009/0315773 A1  Dec. 24, 2009

(30) Foreign Application Priority Data

Jun. 19, 2008  (JP) .................................. 2008-160818

(51) Int. Cl.
*G01S 19/27* (2010.01)
(52) U.S. Cl.
USPC .................................................... 342/357.66
(58) Field of Classification Search
USPC .................................................... 342/357.44
See application file for complete search history.

(56) References Cited

U.S. PATENT DOCUMENTS

| | | | |
|---|---|---|---|
| 6,429,808 B1* | 8/2002 | King et al. | 342/357.44 |
| 6,671,620 B1 | 12/2003 | Garin et al. | |
| 6,915,210 B2 | 7/2005 | Longhurst et al. | |
| 7,142,157 B2 | 11/2006 | Garin et al. | |
| 7,710,317 B2* | 5/2010 | Cheng et al. | 342/357.64 |
| 2008/0238765 A1* | 10/2008 | Zhang et al. | 342/357.01 |
| 2009/0146872 A1* | 6/2009 | Harper et al. | 342/357.1 |

FOREIGN PATENT DOCUMENTS

| | | |
|---|---|---|
| JP | 08-122066 A | 5/1996 |
| JP | 2000-206222 A | 7/2000 |
| JP | 2002-243830 A | 8/2002 |
| JP | 2003-043127 A | 2/2003 |
| JP | 2004-529032 A | 9/2004 |
| JP | 2005-181052 A | 7/2005 |
| JP | 2007-292763 A | 11/2007 |
| JP | 2007-531867 A | 11/2007 |
| WO | WO-02/099454 A2 | 12/2002 |

* cited by examiner

*Primary Examiner* — Harry Liu
(74) *Attorney, Agent, or Firm* — Global IP Counselors, LLP

(57) ABSTRACT

A method for providing satellite orbit ephemeris includes: determining a positioning satellite in view of a reference position; and providing to a positioning device a satellite orbit ephemeris of the positioning satellite in view of the reference position, the satellite orbit ephemeris being valid for at least one day.

8 Claims, 17 Drawing Sheets

351

| DATE AND TIME \ SATELLITE | SV1 | SV2 | SV3 | ... |
|---|---|---|---|---|
| 2008 6/1 0:00 | (X11,Y11,Z11) | (X12,Y12,Z12) | (X13,Y13,Z13) | ... |
| 2008 6/1 0:15 | (X21,Y21,Z21) | (X22,Y22,Z22) | (X23,Y23,Z23) | ... |
| 2008 6/1 0:30 | (X31,Y31,Z31) | (X32,Y32,Z32) | (X33,Y33,Z33) | ... |
| ⋮ | ⋮ | ⋮ | ⋮ | ⋱ |
| 2008 6/7 24:00 | (Xt1,Yt1,Zt1) | (Xt2,Yt2,Zt2) | (Xt3,Yt3,Zt3) | ... |

| DISTRICT (3531) | REFERENCE POSITION (3533) |
|---|---|
| A STATE | (X1,Y1,Z1) |
| B STATE | (X2,Y2,Z2) |
| C STATE | (X3,Y3,Z3) |
| ⋮ | ⋮ |

FIG.12

DISTRICT: A STATE
SATELLITE: SV1

3563-1

| UNIT TERM | ORBIT LONG RADIUS | ECCEN-TRICITY | ORBIT INCLINATION ANGLE | LONGITUDE OF ASCENDING NODE | PERIGEE ARGUMENT | AVERAGE ANOMALY | ... |
|---|---|---|---|---|---|---|---|
| 2008 6/1 0:00~6:00 | $a1^{1/2}$ | e1 | i1 | $\Omega 1$ | $\omega 1$ | M1 | ... |
| 2008 6/1 12:00~18:00 | $a2^{1/2}$ | e2 | i2 | $\Omega 2$ | $\omega 2$ | M2 | ... |
| 2008 6/2 0:00~6:00 | $a3^{1/2}$ | e3 | i3 | $\Omega 3$ | $\omega 3$ | M3 | ... |
| 2008 6/2 12:00~18:00 | $a4^{1/2}$ | e4 | i4 | $\Omega 4$ | $\omega 4$ | M4 | ... |
| ... | ... | ... | ... | ... | ... | ... | ... |
| 2008 6/7 6:00~12:00 | $am^{1/2}$ | em | im | $\Omega m$ | $\omega m$ | Mm | ... |
| 2008 6/7 18:00~24:00 | $an^{1/2}$ | en | in | $\Omega n$ | $\omega n$ | Mn | ... |

FIG.14

METHOD FOR PROVIDING SATELLITE ORBIT EPHEMERIS, SERVER, AND POSITIONING SYSTEM

This application claims priority to Japanese Patent Application No. 2008-160818 filed on Jun. 19, 2008. The entire disclosure of Japanese Patent Application No. 2008-160818 is hereby incorporated herein by reference.

BACKGROUND

1. Technical Field

The present invention relates to a method for providing a satellite orbit ephemeris, a server, and a positioning system.

2. Related Art

A GPS (global positioning system) is widely known as a positioning system using positioning signals, and used in a positioning device included in a cellular phone, a car navigation system, and the like. The GPS measures positions using a positioning calculation that calculates four parameters of three-dimensional coordinates indicating the GPS and clock error based on information such as positions of plural GPS satellites and pseudo distances between the respective GPS satellites and the GPS.

According to the position measurement by the GPS, satellite information such as positions, speeds, moving directions, and the like of the GPS satellites is obtained based on navigation data such as almanac and ephemeris data superimposed on GPS satellite signals transmitted from the GPS satellites, and positioning calculation is performed based on the satellite information and time information. Since the ephemeris data are particularly valuable keys to capturing the satellites, the time to first fix (TTFF) increases when positioning is started with no obtained ephemeris data, for example. Even when it is not a first fix, the capturing time considerably varies depending on whether the ephemeris of the corresponding satellite is obtained or not when the satellite is captured for the first time.

U.S. Pat. No. 7,142,157 discloses a server client system technology that includes a server for predicting an ephemeris for a long term such as one week and providing the predicted ephemeris (hereinafter referred to as the "long-term predicted ephemeris" (satellite orbit ephemeris)) to a positioning device as a client.

According to the technology disclosed in U.S. Pat. No. 7,142,157, data on predicted satellite orbit of all GPS satellites for all terms are provided to the positioning device as the long-term predicted ephemeris. However, the positioning device does not necessarily use all of the data in practical measurement. This is because only a limited number of the GPS satellites disposed on each of six rotation orbit surfaces and rotating around the earth can be observed from the position of the positioning device at a certain time. In this case, the data not used by the positioning device become useless and waste memory.

SUMMARY OF THE INVENTION

It is an advantage of some aspects of the invention to provide a novel method to reduce the amount of data on a long-term predicted ephemeris provided for a positioning device.

A method for providing a satellite orbit ephemeris according to a first aspect of the invention includes: determining a positioning satellite in view of a predetermined reference position; and providing a satellite orbit ephemeris of the positioning satellite in view to a positioning device, where the satellite orbit ephemeris is valid for at least one day.

A server according to a second aspect of the invention includes: a determining unit that determines a positioning satellite in view of a predetermined reference position; and a transmitting unit which transmits a satellite orbit ephemeris of the positioning satellite in view to a positioning device, where the satellite orbit ephemeris is valid for at least one day.

According to these structures, the positioning satellites in view are determined, and the predicted satellite orbit ephemeredes of the positioning satellites in view are provided to the positioning device. Providing the predicted satellite orbit ephemeredes for the positioning satellites that are in view enables to effectively reduces the data size of the predicted satellite orbit ephemeredes.

It is preferable to determine the positioning satellite in view of the reference position at a predetermined time.

According to this structure, the positioning satellites in view at the predetermined time are determined. Providing the predetermined satellite orbit ephemeredes for the positioning satellites that are in view of the reference position at the predetermined time enables to further reduce the data size.

It is preferable that the reference position is (1) a position of the positioning device, (2) a district registered in advance, or (3) a predetermined district for which the predicted satellite orbit ephemeredes are provided.

According to this structure, it enables to determine the positioning satellites in view from the various reference positions in which positioning with the positioning device may take place.

It is preferable to further include: obtaining time series data on predicted positions of positioning satellites; and extracting data on the positioning satellite in view of the reference position from the time series data on the positioning satellites to generate the satellite orbit ephemeris.

According to this structure, the time series data on predicted positions of positioning satellites are obtained. Then, data on the positioning satellite that are in view from the reference position are extracted from the obtained time series data to generate the satellite orbit ephemeris.

It is preferable to generate the satellite orbit ephemeris satellite orbit ephemerisbased on the time series data on the positioning satellite in view of the reference position in parameters of a predetermined approximate model expression approximating satellite orbit.

According to this structure, the satellite orbit ephemeris in parameters of the approximate model expression approximating satellite orbit is produced based on the time series data on the positioning satellite. Using the parameters of the approximate model expression of the satellite orbit rather than the position of the satellite as the satellite orbit ephemeris enables to considerably reduce the data size.

It is preferable satellite orbit ephemeris generate parameters of an approximate model expression of the satellite orbit valid for each predetermined unit term.

According to this structure, the parameters of the approximate model expression of the satellite orbit valid for each predetermined unit term is generated. Dividing approximation of satellite orbit by the approximate model into unit terms enables to accurately approximate the satellite orbit for each of the unit terms.

A positioning system according to a third aspect of the invention includes: a positioning device that measures a position by performing a positioning calculation based on a satellite orbit ephemeris; and a server that provides the satellite orbit ephemeris to the positioning device. The positioning device includes a transmitting unit that transmits a predetermined reference position to the server, a receiving unit that receives the satellite orbit ephemeris from the server, and a positioning unit that measures a position by performing a predetermined positioning calculation based on the received satellite orbit ephemeris. The server includes a determining unit that determines a positioning satellite in view of the reference position received from the positioning device, and a transmitting unit that transmits the satellite orbit ephemeris of the positioning satellite in view of the reference position to the positioning device, where the satellite orbit ephemeris is valid for at least one day.

According to this structure, the positioning device transmits the predetermined reference position to the server. The server determines the positioning satellite in view of the reference position received from the positioning device, and transmits the satellite orbit ephemeris of the positioning satellite in view of the reference position to the positioning device, where the satellite orbit ephemeris is valid for at least one day. Then, the positioning device receives the satellite orbit ephemeris from the server, and performs the predetermined positioning calculation based on the satellite orbit ephemeris for position measurement. In this case, advantages similar to those of the first aspect of the invention are provided.

BRIEF DESCRIPTION OF THE DRAWINGS

The invention will be described with reference to the accompanying drawings, wherein like numbers reference like elements.

FIG. 11 shows an example of a data structure of a satellite predicted ephemeris of the positioning system.

FIG. 12 shows an example of a data structure of reference position data of the positioning system.

FIG. 14 shows an example of a data structure of a long-term predicted ephemeris of the positioning system.

DETAILED DESCRIPTION OF EXEMPLARY EMBODIMENTS

A preferred embodiment according to the invention is hereinafter described with reference to the drawings. The invention is not limited to the embodiments described herein.

1. System Structure

Figure 1:
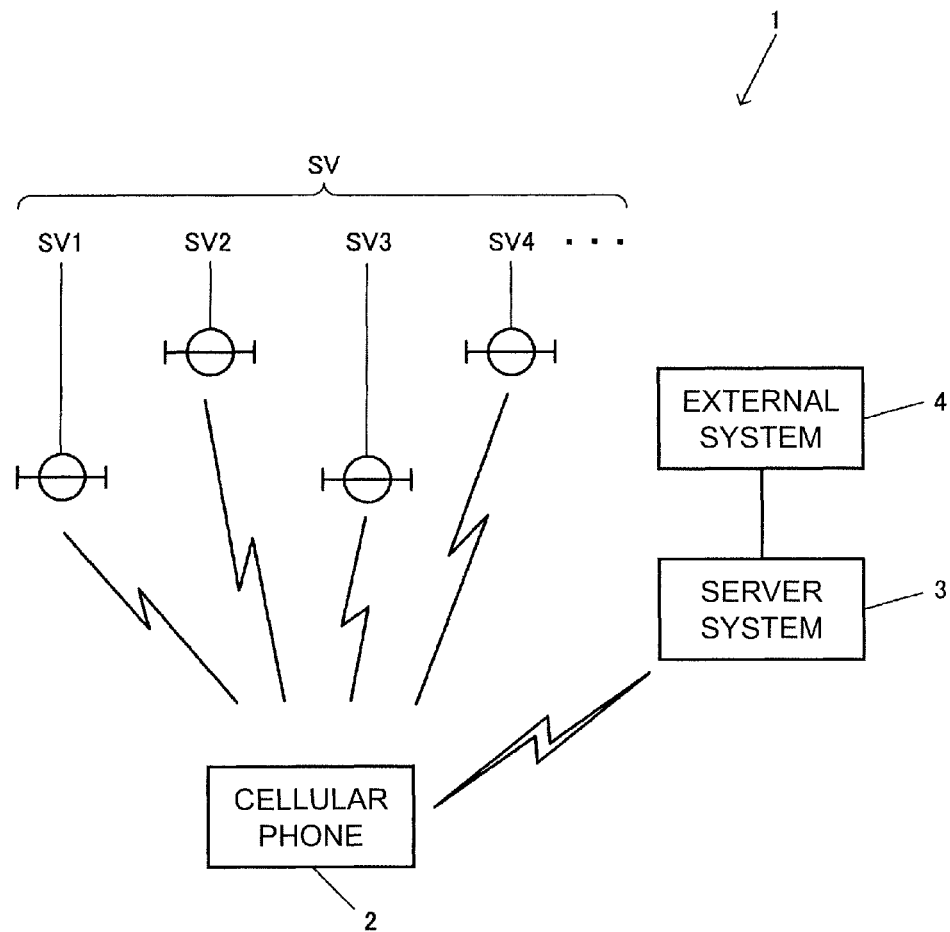
FIG. 1 illustrates a general structure of a positioning system in accordance with a first preferred embodiment of the present invention.

FIG. 1 is a view of a general structure of a positioning system 1 according to a first preferred embodiment of the present invention. The positioning system 1 includes a cellular phone 2 as an electronic device having a positioning device, a server system 3, an external system 4, and a plurality of GPS satellites SV (SV1, SV2, SV3, SV4, and others).

The cellular phone 2 is an electronic device through which the user provides telephone calls and transmission and reception of mail. The cellular phone 2 has a positioning function as well as original functions of the cellular phone such as functions for providing telephone calls and transmission and reception of mails. The cellular phone 2 transmits a request signal requesting a predicted ephemeris of all the GPS satellites SV and effective (or valid) for a long term (hereinafter referred to as "long-term" predicted ephemeris (satellite orbit ephemeris)) to the server system 3 in response to operation of the user. "Long-term" preferably means at least one day, and more preferably, one week. Then, the cellular phone 2 receives a long-term predicted ephemeris from the server system 3 and performs a predetermined positioning calculation by using the long-term predicted ephemeris for the position measurement.

The user is able to register districts for using the cellular phone 2 in advance. For example, when the cellular phone 2 is used in the United States, the user is able to register whether the cellular phone 2 is to be used for each state of the United States. When the user plans to use the cellular phone 2 in A state and B state, he or she registers "A state" and "B state" as use districts. Then, the cellular phone 2 obtains long-term a predicted ephemeris corresponding to the registered use districts from the server system 3. When no use district is registered, the cellular phone 2 obtains a long-term predicted ephemeris corresponding to the district to which the latest measured position of the cellular phone 2 belongs (hereinafter referred to as the "latest measured position") from the server system 3.

The server system 3 is a system including a server that obtains a satellite predicted ephemeris as data on the predicted positions of the respective GPS satellites SV from the external system 4 and produces and provides a long-term predicted ephemeris for each of plural districts determined as areas for providing a long-term predicted ephemeris in advance by using the received satellite predicted ephemeris. The server system 3 transmits the long-term predicted ephemeris thus produced to the cellular phone 2 having received a request signal requesting the long-term predicted ephemeris.

More specifically, when receiving a request signal containing a use district from the cellular phone 2, the server system 3 transmits the long-term ephemeris corresponding to the use district. When receiving a request signal containing the latest measured position, the server system determines the district to which the latest measured position belongs, and transmits long-term predicted ephemeris corresponding to the district. The server system 3 may be constituted by either one computer system or a plurality of computer systems.

The external system 4 periodically receives satellite signals from the GPS satellites SV and produces a satellite predicted ephemeris based on navigation data and the like contained in the satellite signals to provide the satellite predicted ephemeris for the server system 3. The satellite predicted ephemeris provided by the external system 4 is a group of data containing satellite positions disposed according to time series for each of the GPS satellites SV as data on discontinuous positions. The external system 4 corresponds to a computer system possessed by a private or governmental organization for providing satellite predicted ephemerides, for example.

2. Cellular Phone 2-1. Function Structure

Figure 2:
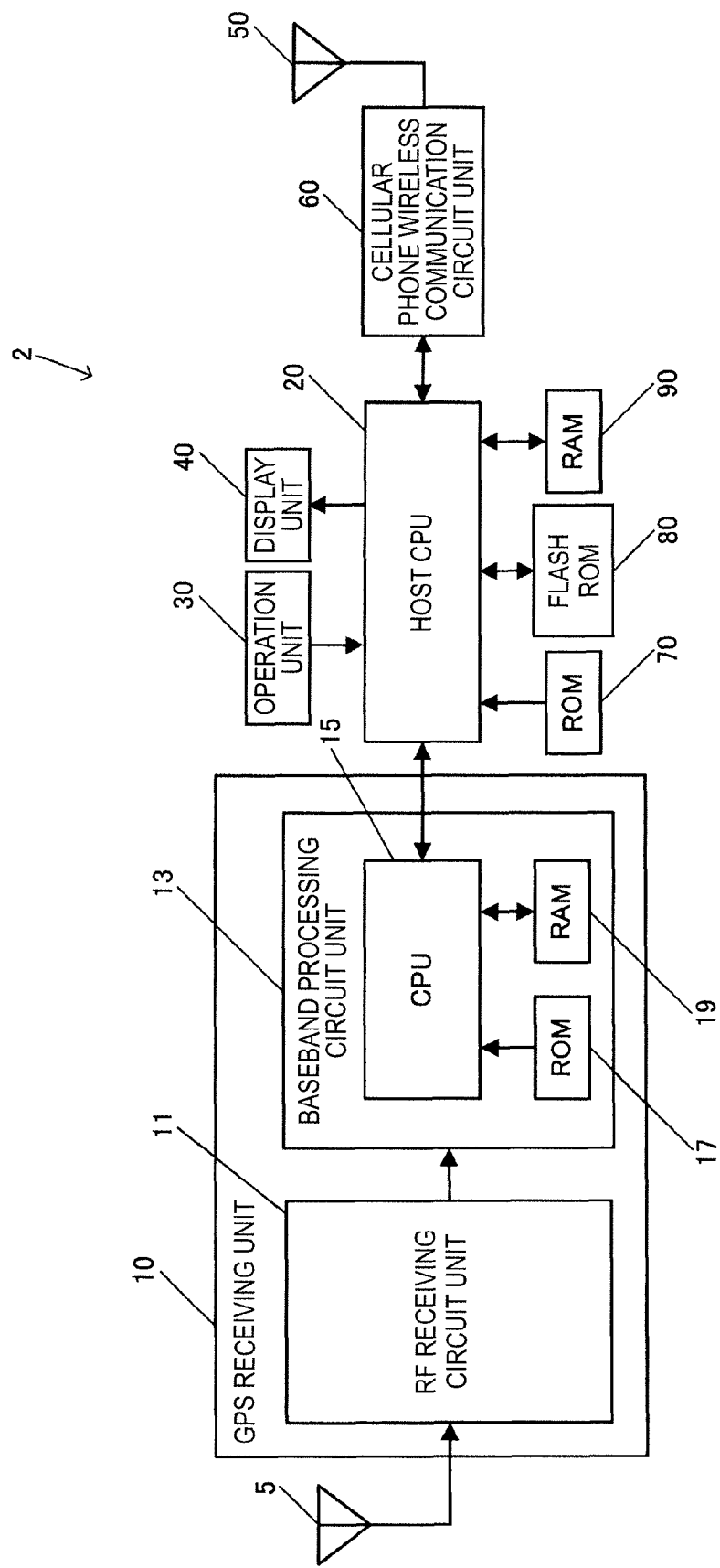
FIG. 2 is a block diagram showing a function structure of a cellular phone of the positioning system.

FIG. 2 is a view of a block diagram showing a function structure of the cellular phone 2 in this embodiment. The cellular phone 2 includes a GPS antenna 5, a GPS receiving unit 10, a host CPU (central processing unit) 20, an operation unit 30, a display unit 40, a cellular phone antenna 50, a cellular phone wireless communication circuit unit 60, a ROM (read only memory) 70, a flash ROM 80, and a RAM (random access memory) 90.

The GPS antenna 5 is an antenna that receives RF (radio frequency) signals containing GPS satellite signals transmitted from the GPS satellites, and outputs received signals to the GPS receiving unit 10. The GPS satellite signals are preferably communication signals having 1.57542 [GHz] and modulated by direct spectrum diffusion system using PRN (pseudo random noise) codes as one type of diffusion codes different according to satellites. The PRN codes are preferably pseudo random noise codes having repetitive cycle of 1 ms and setting 1PN frame at code length 1,023 chips.

The GPS receiving unit 10 is a positioning circuit that measures positions based on signals outputted from the GPS antenna 5 as a function block corresponding to a so-called GPS receiver. The GPS receiving unit 10 preferably has an RF (radio frequency) receiving circuit unit 11 and a baseband processing circuit unit 13. The RF receiving circuit unit 11 and the baseband processing circuit unit 13 may be manufactured as separate LSI (large scale integration) units or as 1 chip.

The RF receiving circuit unit 11 is a circuit block for processing RF signals, and produces oscillation signals to be multiplied by RF signals by dividing or multiplying predetermined local oscillation signals. Then, the RF receiving circuit unit 11 down-converts the RF signals into signals having intermediate frequency (hereinafter referred to as "IF (intermediate frequency) signals" by multiplying the produced oscillation signals by the RF signals outputted from the GPS antenna 5. After amplifying the IF signals or executing other processing for the IF signals, the RF receiving circuit unit 11 converts the resultant IF signals into digital signals by using an A/D (analog/digital) converter to output the produced digital signals to the baseband processing circuit unit 13.

The baseband processing circuit unit 13 is a circuit unit that captures and extracts GPS satellite signals by applying a correlation process or the like to the IF signals outputted from the RF receiving circuit unit 11. The baseband processing circuit unit 13 includes a CPU 15 as a processor, and a ROM 17 and a RAM 19 as memories. According to this embodiment, the CPU 15 captures and extracts GPS satellite signals by using the long-term predicted ephemeris received from the server system 3 under the control of the host CPU 20.

The host CPU 20 is a processor that collectively controls the respective components of the cellular phone 2 according to various programs such as a positioning calculation program and system program stored in the ROM 70. The host CPU 20 decodes data from the GPS satellite signals captured and extracted by the baseband processing circuit unit 13 and extracts navigation messages, time information, and the like to perform positioning calculation. Then, a navigation screen on which positions obtained by the positioning calculation are plotted is displayed on the display unit 40.

The operation unit 30 is an input device preferably including a touch panel and button switch, for example, and outputs signals associated with pushed icons and buttons to the host CPU 20. By operation through the operation unit 30, various types of commands such as call request, mail transmission and reception request, GPS startup request, and others are inputted.

The display unit 40 is a display device preferably including an LCD (liquid crystal display) and the like, and provides various displays based on display signals inputted from the host CPU 20. The display unit 40 displays a navigation screen, time information, and the like.

The cellular phone antenna 50 is an antenna that transmits and receives cellular phone wireless signals between the cellular phone antenna 50 and a wireless base station provided by a communication service provider of the cellular phone 2.

The cellular phone wireless communication circuit unit 60 is a communication circuit unit of a cellular phone including an RF conversion circuit, a baseband processing circuit and others, and provides telephone calls and transmission and reception of mail by performing processes such as modulation and demodulation of cellular phone wireless signals.

The ROM 70 is a non-volatile read-only memory unit, and stores system program to control the cellular phone 2 by the host CPU 20, positioning calculation program to perform positioning calculation, and various types of programs, data and the like to provide navigation functionality.

The flash ROM 80 is a readable and writable non-volatile memory unit, and stores various programs, data, and the like to control the cellular phone 2 by the host CPU 20 similarly to the ROM 70. The data stored in the flash ROM 80 is not lost even when power supply of the cellular phone 2 is cut off.

The RAM 90 is a readable and writable non-volatile memory unit, and has a work area to store temporarily a system program, positioning calculation program, various types of processing programs, data under various types of processing, processing results, and the like performed and provided by the host CPU 20.

2-2. Data Structure

Figure 3:
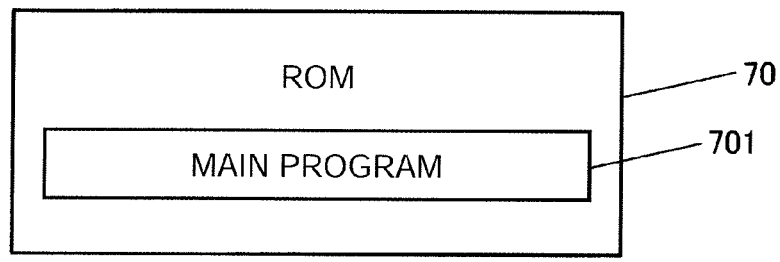
FIG. 3 shows an example of data stored in a ROM of the cellular phone.

FIG. 3 shows an example of data stored in the ROM 70. The ROM 70 stores a main program 701 read by the host CPU 20 and executed as a main process (see FIG. 6).

The main process is a process in which the host CPU 20 performs a process to provide telephone calls and transmission and reception of mail as an original function of the cellular phone 2, process to register use districts of the cellular phone 2, process to position, process to increase speed of the initial positioning after power supply to the cellular phone 2, and other processes. The details of the main process will be described later with reference to a flowchart.

Figure 4:
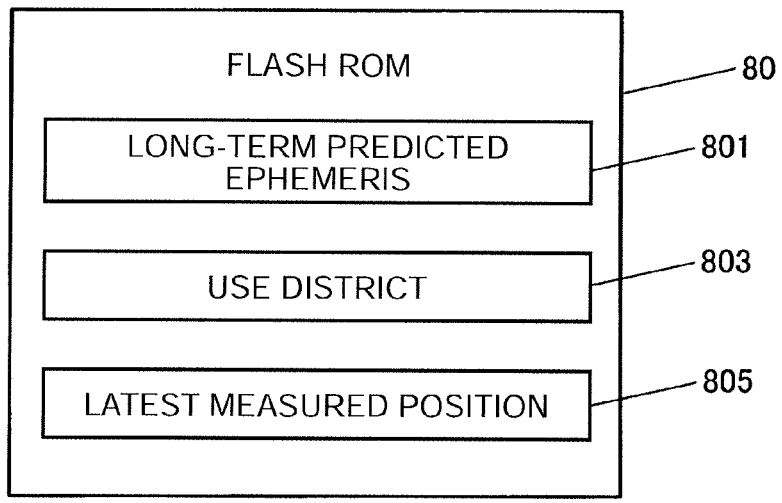
FIG. 4 shows an example of data stored in a flash ROM of the cellular phone.

FIG. 4 shows an example of data stored in the flash ROM 80. The flash ROM 80 stores a long-term predicted ephemeris 801 received from the server system 3, a use district 803 of the cellular phone 2, and a latest measured position 805 as a measured position obtained latest by positioning process. These data are updated by the host CPU 20 in the main process.

Figure 5:
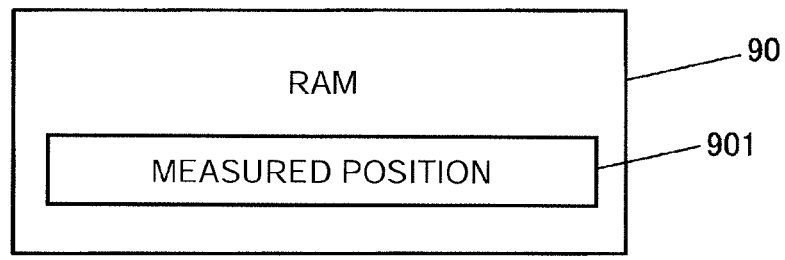
FIG. 5 shows an example of data stored in a RAM of the cellular phone.

FIG. 5 shows an example of data stored in the RAM 90. The RAM 90 stores a measured position 901 obtained by the positioning process. The measured position 901 is updated by the host CPU 20 in the main process.

2-3. Flow of Process

Figure 6:
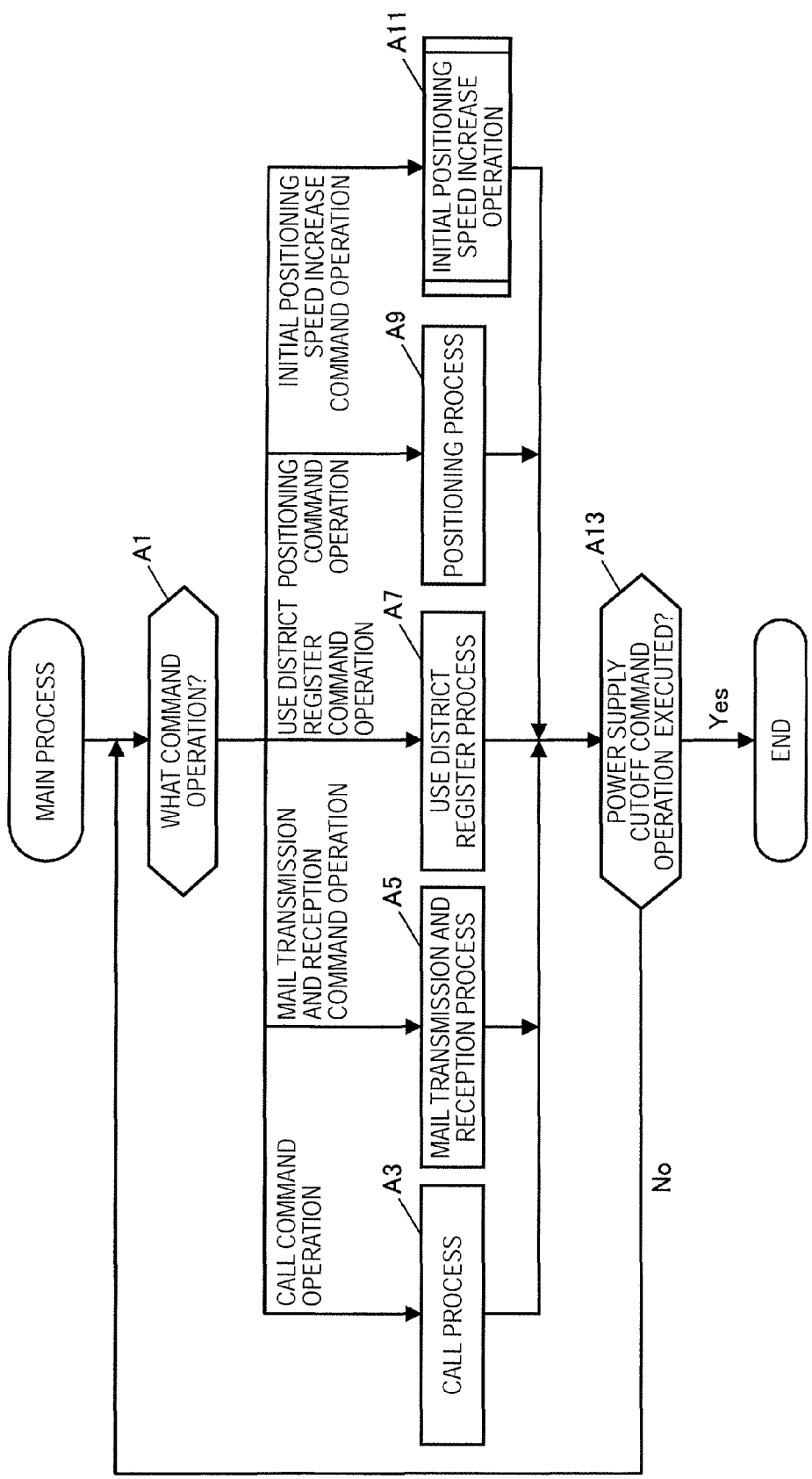
FIG. 6 is a view of a flowchart showing a flow of a main process of the positioning system.

FIG. 6 is a view of a flowchart showing a flow of the main process performed in the cellular phone 2 by reading and executing the main program 701 stored in the ROM 70 using the host CPU 20.

The main process is a process that initiates processing when the host CPU 20 detects a power supply operation by the user through the operation unit 30. Though not particularly described, reception of RF signals by the GPS antenna 5 and down-conversion of the RF signals into IF signals by the RF receiving circuit unit 11 are performed during execution of the main process described herein such that IF signals can be outputted to the baseband processing circuit unit 13 as necessary.

Initially, the host CPU 20 analyzes a command operation provided through the operation unit 30 (step A1), and performs a call process (step A3) when judging that the command operation is a telephone call command operation (step A1; call command operation). More specifically, the host CPU 20 commands the cellular phone wireless communication circuit unit 60 to provide base station communication with a wireless base station such that a telephone call between the cellular phone 2 and another phone can be achieved.

When judging that the command operation is a mail transmission and reception command operation in step A1 (step A1; mail transmission and reception command operation), the host CPU 20 performs a mail transmission and reception process (step A5). More specifically, the host CPU 20 commands the cellular phone wireless communication circuit unit 60 to provide a base station communication with a wireless base station such that mail transmission and reception between the cellular phone 2 and the other phone can be achieved.

When judging that the command operation is a use district register command operation in step A1 (step A1; use district register command operation), the host CPU 20 performs a use district register process (step A7). More specifically, the host CPU 20 displays a list of use districts on the display unit 40, and requires the user to select one or plural use districts. Then, the host CPU 20 stores the use district 803 selected by the user through the operation unit 30 in the flash ROM 80.

When judging that the command operation is a positioning command operation in step A1 (step A1; positioning command operation), the host CPU 20 performs a positioning process (step A9). More specifically, the host CPU 20 commands the CPU 15 of the baseband processing circuit unit 13 to capture and extract GPS satellite signals using long-term predicted ephemeris 801 stored in the flash ROM 80.

Then, the host CPU 20 performs a positioning process by reading the positioning calculation program from the ROM 70 and performing a predetermined positioning calculation by using the GPS satellite signals captured and extracted by the CPU 15. The positioning calculation can be executed by known methods such as the minimum square method or positioning calculation using the Karman filter. Then, the host CPU 20 stores the measured position 901 obtained by the positioning calculation in the RAM 90, and updates the latest measured position 805 in the flash ROM 80 by the measured position 901.

When judging that the command operation is an initial positioning speed increase command operation in step A1 (step A1; initial positioning speed increase command operation), the host CPU 20 performs an initial positioning speed increase process (step A11).

Figure 7:
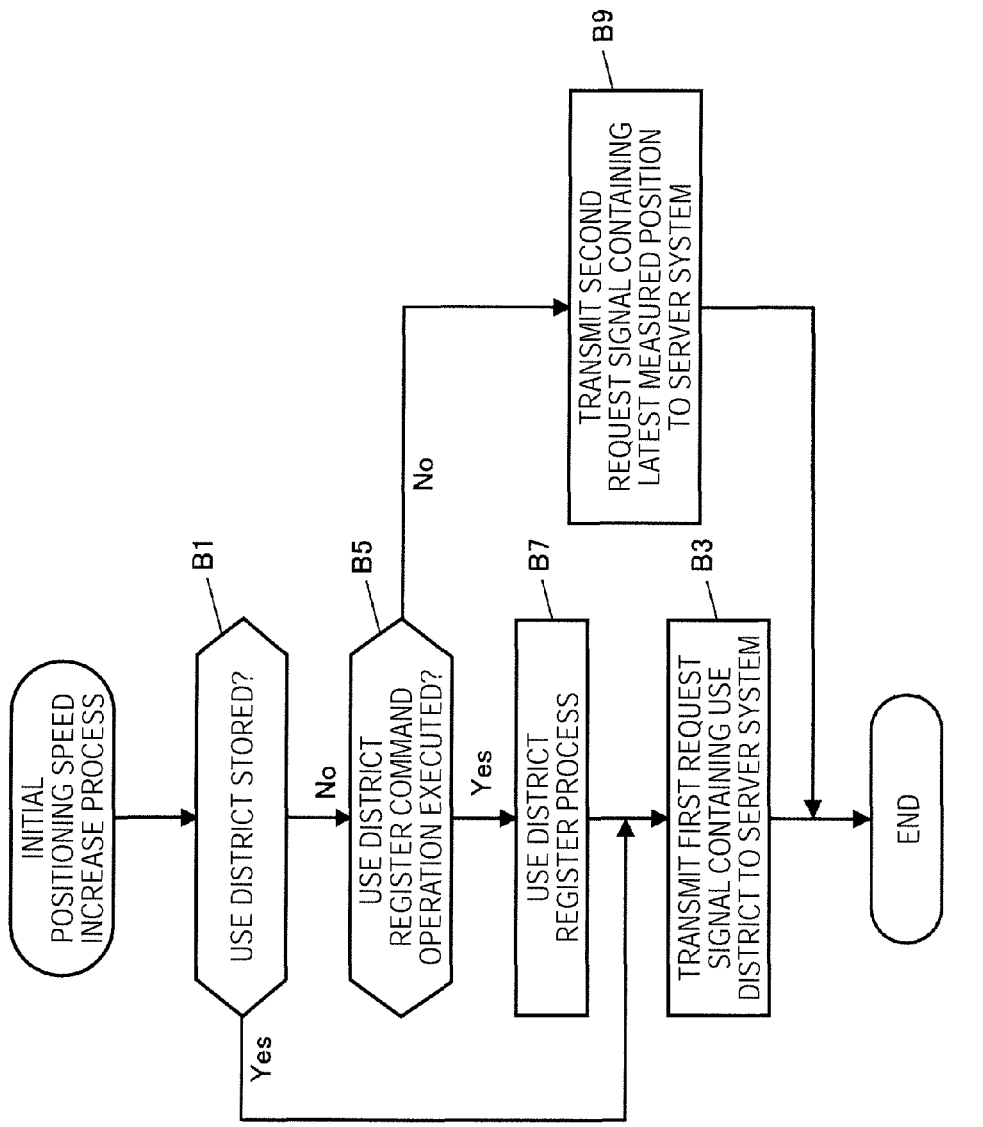
FIG. 7 is a view of a flowchart showing a flow of an initial positioning speed increase process of the main process.

FIG. 7 is a flowchart showing flow of the initial positioning speed increase process.

Initially, the host CPU 20 judges whether the use district 803 is stored in the flash ROM 80 or not (step B1). When judging that the use district 803 is stored (step B1; YES), the host CPU 20 transmits a first request signal including a request for the use district 803 to the server system 3 (step B3). Then, the host CPU 20 ends the initial positioning speed increase process.

When judging that the use district 803 is not stored in step B1 (step B1; NO), the host CPU 20 judges whether a use district register command process has been performed by the user through the operation unit 30 or not (step B5). When judging that the use district register command operation has been performed (step B5; YES), the host CPU 20 executes the use district register process (step B7), and goes to step B3. The use district register process is the process described in step A7.

When judging that the use district register command operation has not been performed in step B5 (step B5; NO), the host CPU 20 transmits a second request signal stored in the flash ROM 80, including a request for the latest measured position 805 to the server system 3 (step B9). Then, the host CPU 20 ends the initial positioning speed increase process.

Returning to the main process in FIG. 6, the host CPU 20 judges whether power supply cutoff command operation has been executed by the user through the operation unit 30 or not after performing any of the processes in steps A3 through A1 (step A13). When judging that the power supply cutoff command operation has not been executed (step A13; NO), the host CPU 20 returns to step A1. When judging that the power supply cutoff command operation has been executed (step A13; YES), the host CPU 20 ends the main process.

3. Server System 3-1. Function Structure

Figure 8:
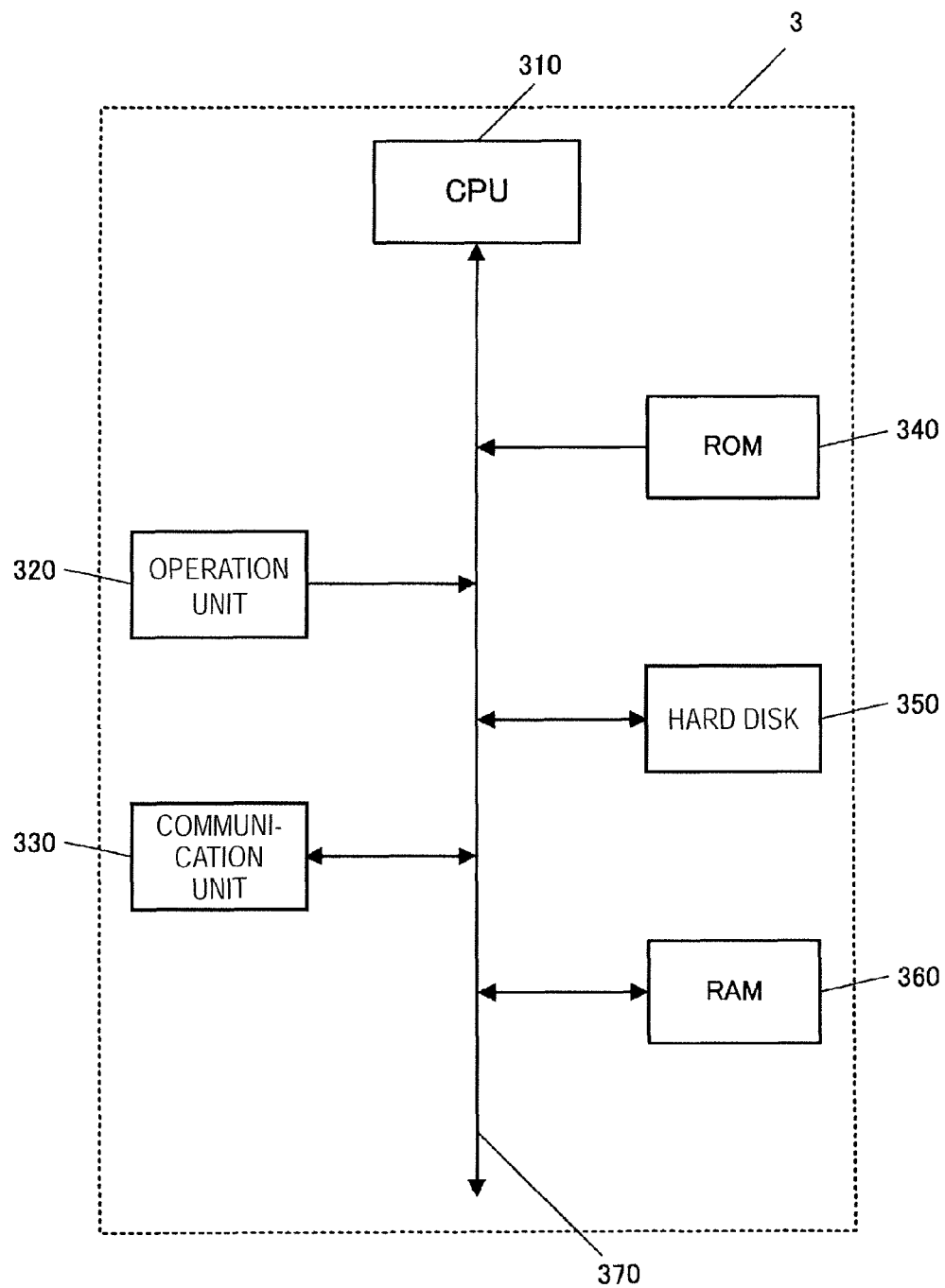
FIG. 8 is a view of a block diagram showing a function structure of a server system of the positioning system.

FIG. 8 is a view of a block diagram showing the function structure of the server system 3. The server system 3 is a computer system which includes a CPU 310, an operation unit 320, a communication unit 330, a ROM 340, a hard disk 350, and a RAM 360, and all the components of the server system 3 are connected with one another via a bus 370.

The CPU 310 is a processor that collectively controls the respective components of the server system 3 according to the system program and the like stored in the ROM 340. Particularly in this embodiment, the CPU 310 performs a process to provide a long-term predicted ephemeris to the cellular phone 2 according to a long-term predicted ephemeris providing program 341 stored in the ROM 340.

The operation unit 320 is an input device that receives operation commands issued from the supervisor of the server system 3 and outputs signals corresponding to operations to the CPU 310. This function is provided through a keyboard, button, mouse, or the like.

The communication unit 330 is a communication device that exchanges various types of data used within the system with the cellular phone 2 and the external system 4 via a communication network such as the Internet.

The ROM 340 stores various types of programs and data such as the system program to control the server system 3 by the CPU 310 and program to provide long-term predicted ephemeris to the cellular phone 2.

The hard disk 350 is a memory unit that reads and writes data by using a magnetic head or the like, and stores programs and data to provide various functions of the server system 3 similarly to the ROM 340.

The RAM 360 is used as a work area of the CPU 310, and chiefly stores data under processing in the long-term predicted ephemeris providing process.

3-2. Data Structure

Figure 9:
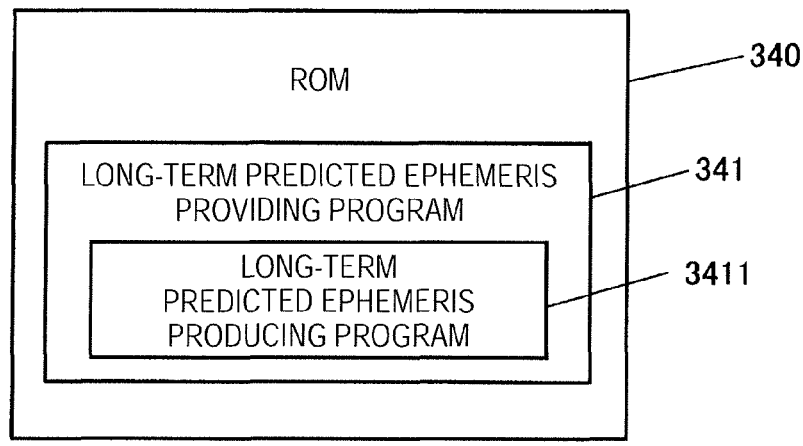
FIG. 9 shows an example of data stored in a ROM of the server system.

FIG. 9 shows an example of data stored in the ROM 340. The ROM 340 stores the long-term predicted ephemeris providing program 341 read and performed by the CPU 310 to execute a long-term predicted ephemeris providing process (see FIG. 16). The long-term predicted ephemeris providing program 341 contains a long-term predicted ephemeris producing program 3411 as sub-routine to execute the long-term predicted ephemeris producing process (see FIGS. 17 and 18).

The long-term predicted ephemeris providing process is a process that periodically produces a long-term predicted ephemeris for each of the predetermined districts, and transmits the long-term predicted ephemeris of the corresponding district when receiving a signal requesting the long-term predicted ephemeris from the cellular phone 2 to the cellular phone 2 having requested the long-term predicted ephemeris. The details of the long-term predicted ephemeris providing process will be described later with reference to a flowchart.

The long-term predicted ephemeris producing process is a process that produces the long-term predicted ephemeris by using the CPU 310. More specifically, this process calculates elevation angles of the respective GPS satellites in the respective districts based on the satellite positions of the GPS satellites stored in the satellite predicted ephemeris received from the external system 4 and predetermined reference positions for the respective districts, and then judges whether the respective GPS satellites are observable in each of the plural unit terms based on the calculated elevation angles.

According to this embodiment, the CPU 310 generates a long-term predicted ephemeris once for every four hours, and produces a long-term predicted ephemeris for the predicted period by establishing the positioning period from the generation date and time of the long-term predicted ephemeris as a reference lasting one week. Then, the positioning period of one week is divided into 6-hour divisions as unit terms.

For the unit term during which the GPS satellite are observable according to judgment, the CPU 310 calculates the satellite orbit of the corresponding GPS satellite in the corresponding unit term by using an approximate Kepler model, and adds a parameter value of the approximate model to the long-term predicted ephemeris. For the unit term during which the GPS satellite cannot be observed according to judgment, the satellite orbit of the GPS satellite in the corresponding unit term is not calculated, and no data are produced for this unit term. The details of the long-term predicted ephemeris producing process will be described later with reference to a flowchart.

Figure 10:
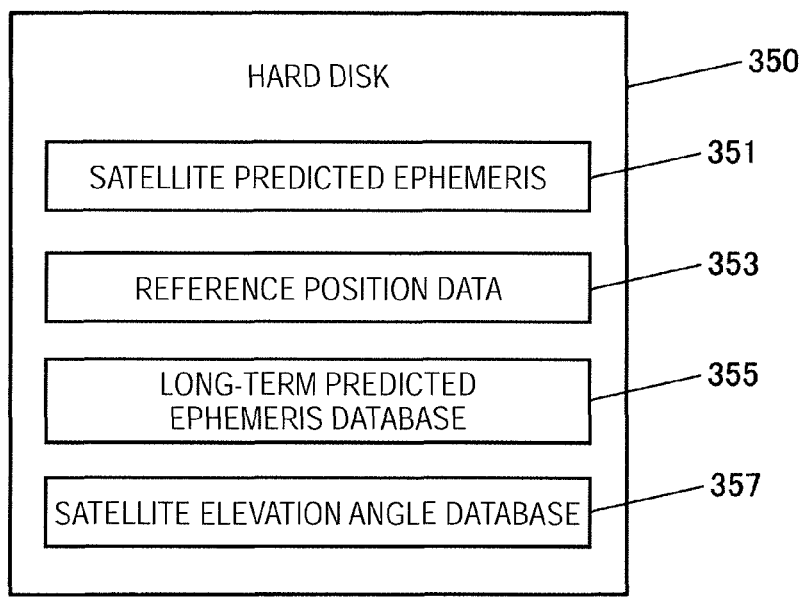
FIG. 10 shows an example of data stored in a hard disk of the server system.

FIG. 10 shows an example of data stored in the hard disk 350. The hard disk 350 stores a satellite predicted ephemeris 351, reference position data 353, a long-term predicted ephemeris database 355, and a satellite elevation angle database 357.

FIG. 11 shows an example of a data structure of the satellite predicted ephemeris 351. The satellite predicted ephemeris 351 is discrete data containing satellite positions of the respective GPS satellites SV1, etc. for every 15 minutes for one week into the future. The satellite positions are indicated by three-dimensional coordinates in the earth reference coordinate system, for example. In this system, the satellite position of the GPS satellite "SV2" at "0:30, Jun. 1, 2008" is represented by "(X32, Y32, Z32)," for example.

The CPU 310 updates the satellite predicted ephemeris 351 of the hard disk 350 by the satellite predicted ephemeris 351 periodically transmitted (such as once per four hours) from the external system 4. The CPU 310 calculates each satellite orbit of the GPS satellites based on the approximate Kepler model setting the satellite position stored in the satellite predicted ephemeris 351 as a sample point. Then, the CPU 310 produces a long-term predicted ephemeris constituted by parameters (satellite orbit parameters of Kepler) representing the calculated satellite orbit.

FIG. 12 shows an example of data structure of the reference position data 353. The reference position data 353 is data storing correspondence between district 3531 and reference position 3533. The reference position 3533 stores coordinates according to the earth reference coordinate system at predetermined positions set in the district 3531 in advance. For example, the reference position set for the district "A state" is "(X1, Y1, Z1)."

The CPU 310 calculates elevation angles of the respective GPS satellites SV based on the satellite positions of the GPS satellites SV stored in the satellite predicted ephemeris 351 and the reference position 3533 stored in the reference position data 353, and stores the calculated elevation angles in the satellite elevation angle database 357.

Figure 13:
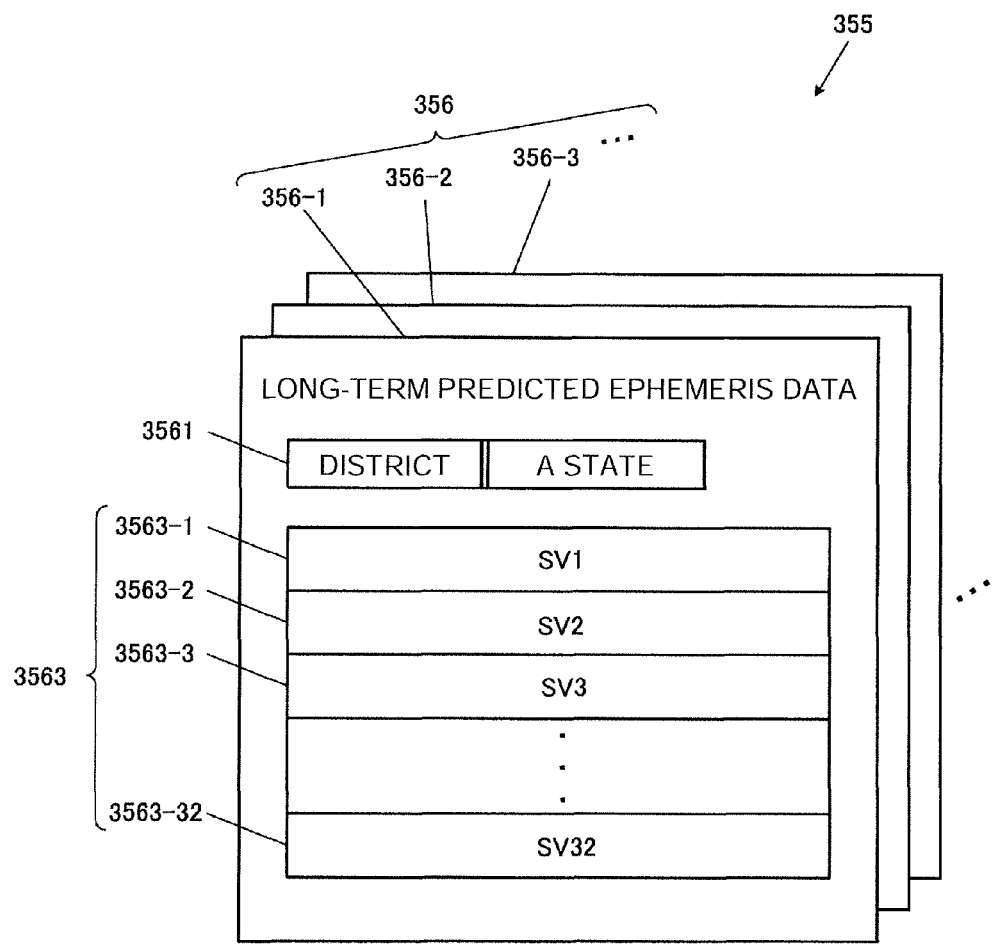
FIG. 13 shows an example of a data structure of a long-term predicted ephemeris database of the positioning system.

FIG. 13 shows an example of a data structure of the long-term predicted ephemeris database 355. The long-term predicted ephemeris database 355 stores long-term ephemeris data 356 (356-1, 356-2, 356-3, and others). The long-term predicted ephemeris data 356 store correspondence between the district 3561 and the long-term predicted ephemeris 3563 (3563-1, 3563-2, up to 3563-32).

FIG. 14 shows an example of a data structure of the long-term predicted ephemeris 3563 for the respective GPS satellites. This figure shows a data structure of the long-term predicted ephemeris 3563-1 of the GPS satellite "SV1" stored in association with the district "A state." The long-term predicted ephemeris 3563 stores satellite orbit parameters of Kepler corresponding to this GPS satellite for each unit term of 6 hours.

This data structure is characterized in that Kepler satellite orbit parameters in all of the unit terms are not stored. In case of the long-term predicted ephemeris 3563-1, "June 1" and "June 2" in 2008, for example, Kepler satellite orbit parameters are stored in the unit terms of "0-6" and "12-18," but not stored in the unit terms of "6-12" and "18-24." This is because satellite orbit of the GPS satellite "SV1" is not calculated for the unit terms of "6-12" and "18-24" based on the judgment that the GPS satellite "SV1" cannot be observed in the district "A state" during these unit terms.

Similarly, it is judged that the GPS satellite "SV1" cannot be observed in the district "A state" in the unit terms of "0-6" and "12-18" in "Jun. 7, 2008." Thus, satellite orbit of the GPS satellite "SV1" is not calculated for these unit terms, and no satellite orbit parameter of Kepler is stored.

As should be apparent from this disclosure, satellite orbit of the target GPS satellite is not calculated for the unit term during which the corresponding GPS satellite cannot be observed according to the judgment. Accordingly, the necessity for storing Kepler satellite orbit parameters for all the unit terms of all the GPS satellites is eliminated, and thus the amount of data on the long-term predicted ephemeris provided for the cellular phone 2 are reduced.

Figure 15:
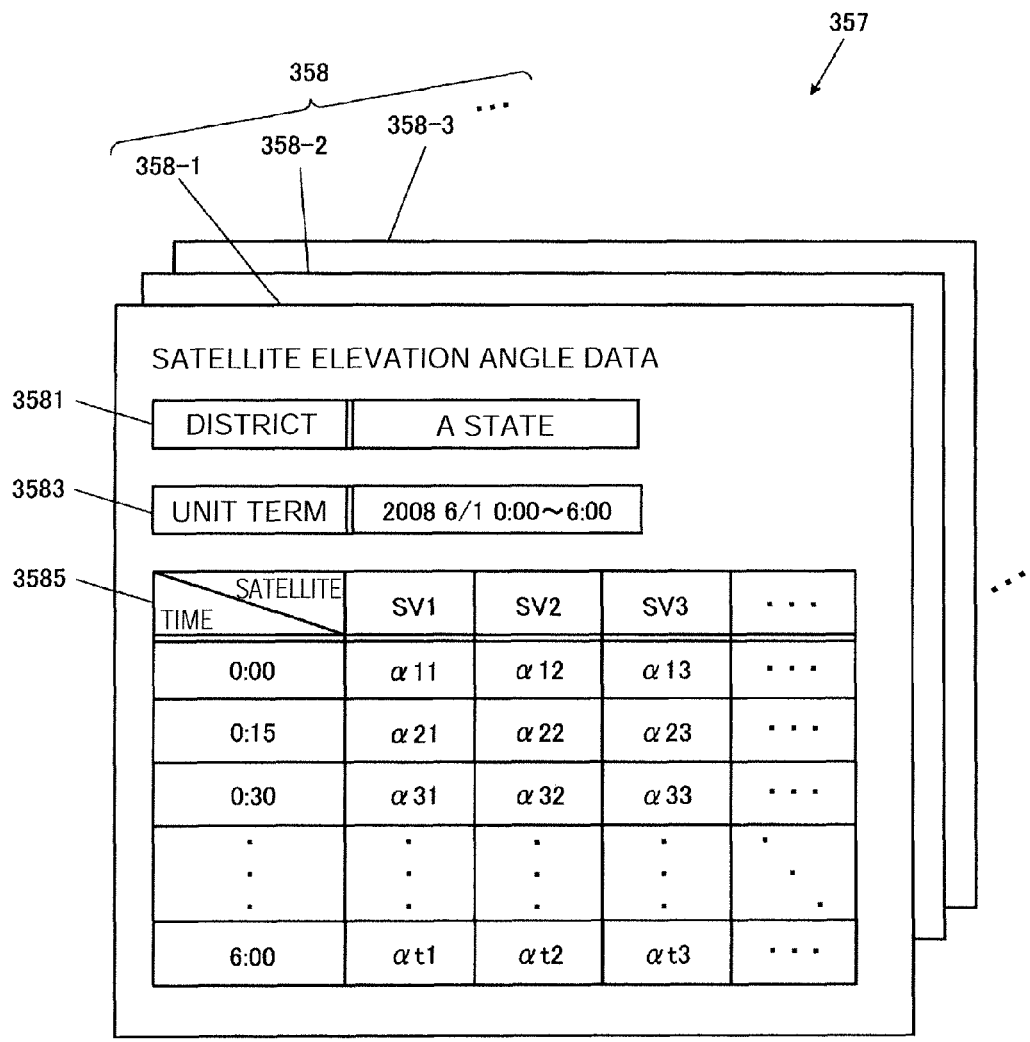
FIG. 15 shows an example of a data structure of a satellite elevation angle database of the positioning system.

FIG. 15 shows an example of data structure of the satellite elevation angle database 357. The satellite elevation angle database 357 stores satellite elevation angle data 358 (358-1, 358-2, 358-3, and others). Each of the satellite elevation angle data 358 stores correspondence between the district 3581, the unit term 3583, and elevation angle data 3585 for every 15 minutes in the corresponding unit term of each GPS satellite SV.

3-3. Flow of Process

Figure 16:
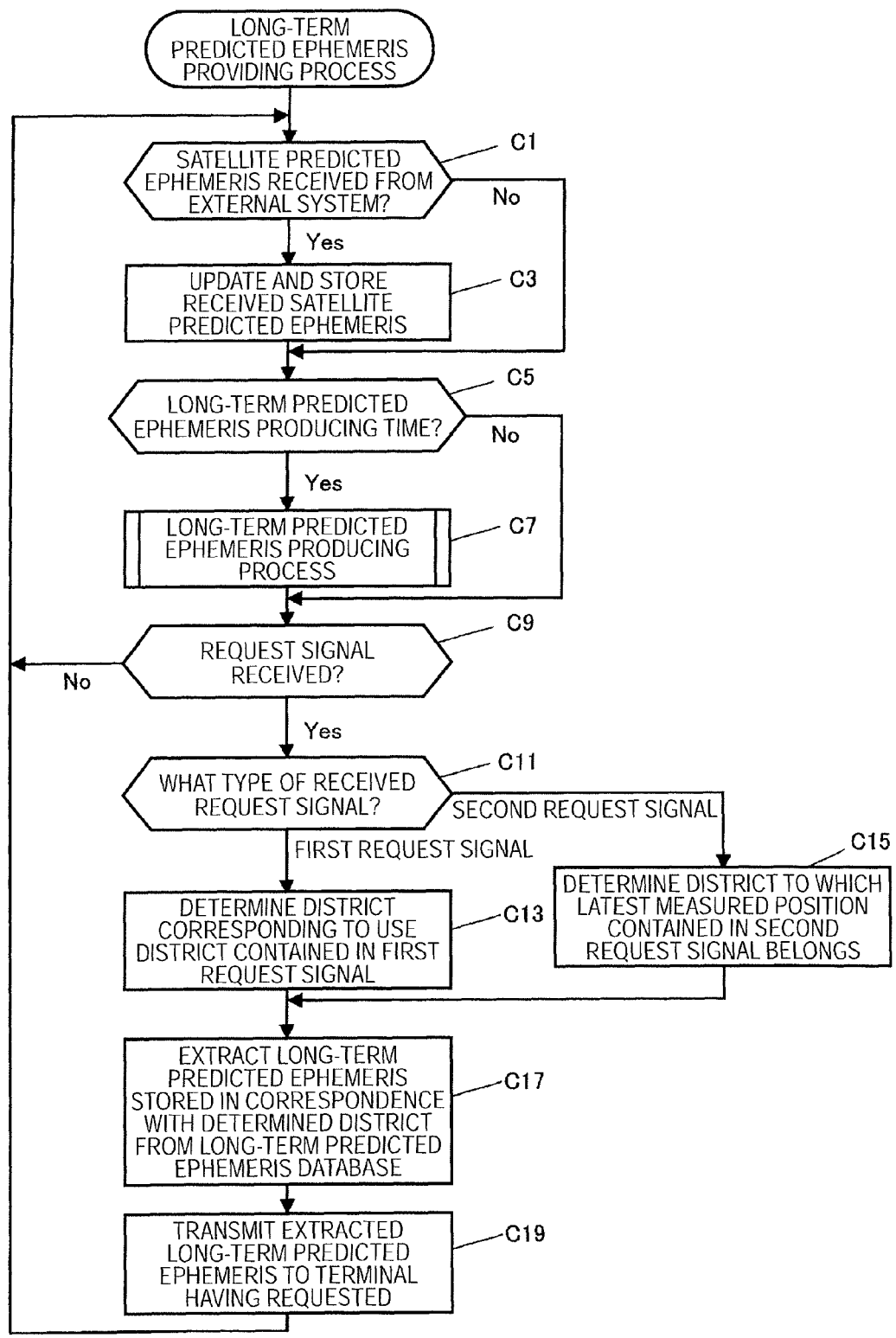
FIG. 16 is a view of a flowchart showing a flow of a long-term predicted ephemeris providing process of the positioning system.

FIG. 16 is a view of a flowchart showing a flow of the long-term predicted ephemeris providing process performed by the server system 3, which reads and performs the long-term predicted ephemeris providing program 341 stored in the ROM 340 by using the CPU 310.

Initially, the CPU 310 judges whether satellite predicted ephemeris has been received from the external system 4 (step C1). When judging that the satellite predicted ephemeris has not been received (step C1; NO), the CPU 310 advances the flow to step C5. When judging that the satellite predicted ephemeris has been received (step C1; YES), the CPU 310 updates the satellite predicted ephemeris 351 by the received satellite predicted ephemeris and stores the updated satellite predicted ephemeris in the hard disk 350 (step C3).

Then, the CPU 310 judges whether it is time to produce a long-term predicted ephemeris (step C5). In this embodiment, a long-term predicted ephemeris is generated once for every four hours. When judging that it is not time to produce a long-term predicted ephemeris (step C5; NO), the CPU 310 advances the flow to step C9.

When judging that it is time to produce the long-term predicted ephemeris (step C5; YES), the CPU 310 carries out the long-term predicted ephemeris producing process by reading and executing the long-term predicted ephemeris producing program 3411 stored in the ROM 340 (step C7).

Figure 17:
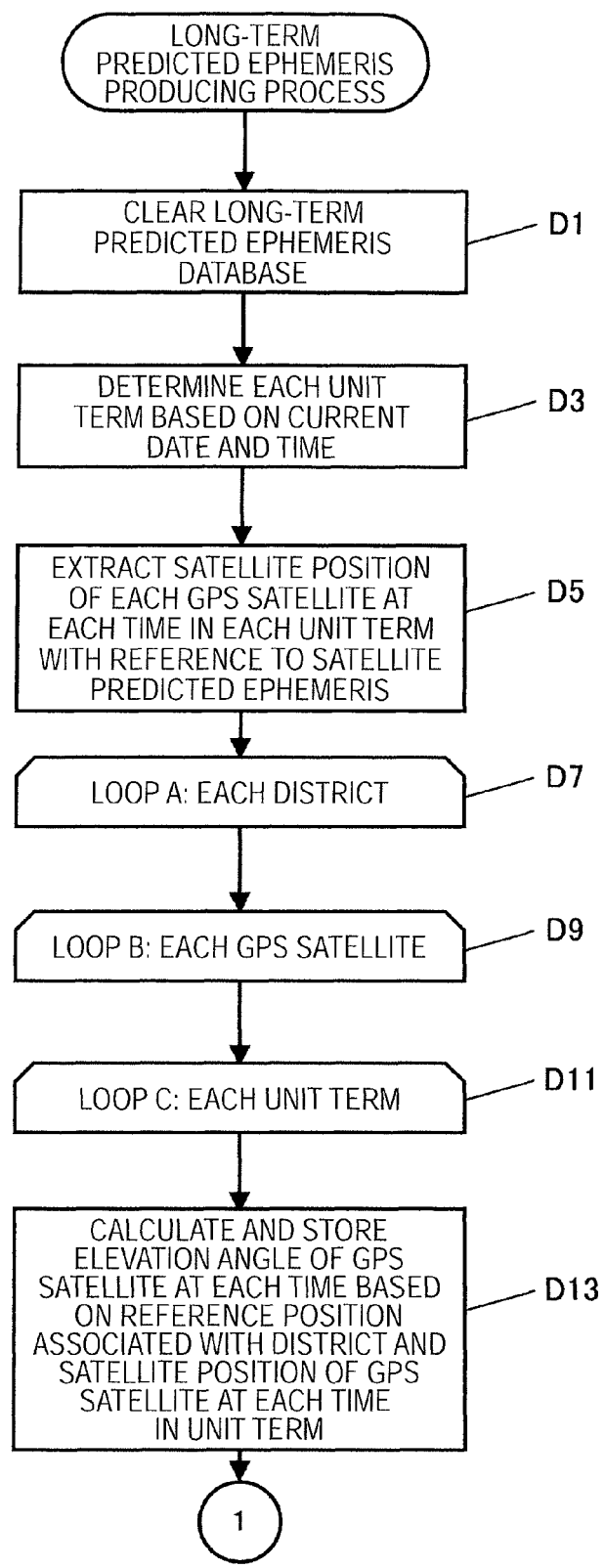
FIG. 17 is a view of a flowchart showing a flow of a part of a long-term predicted ephemeris producing process of the long-term predicted ephemeris providing process.
Figure 18:
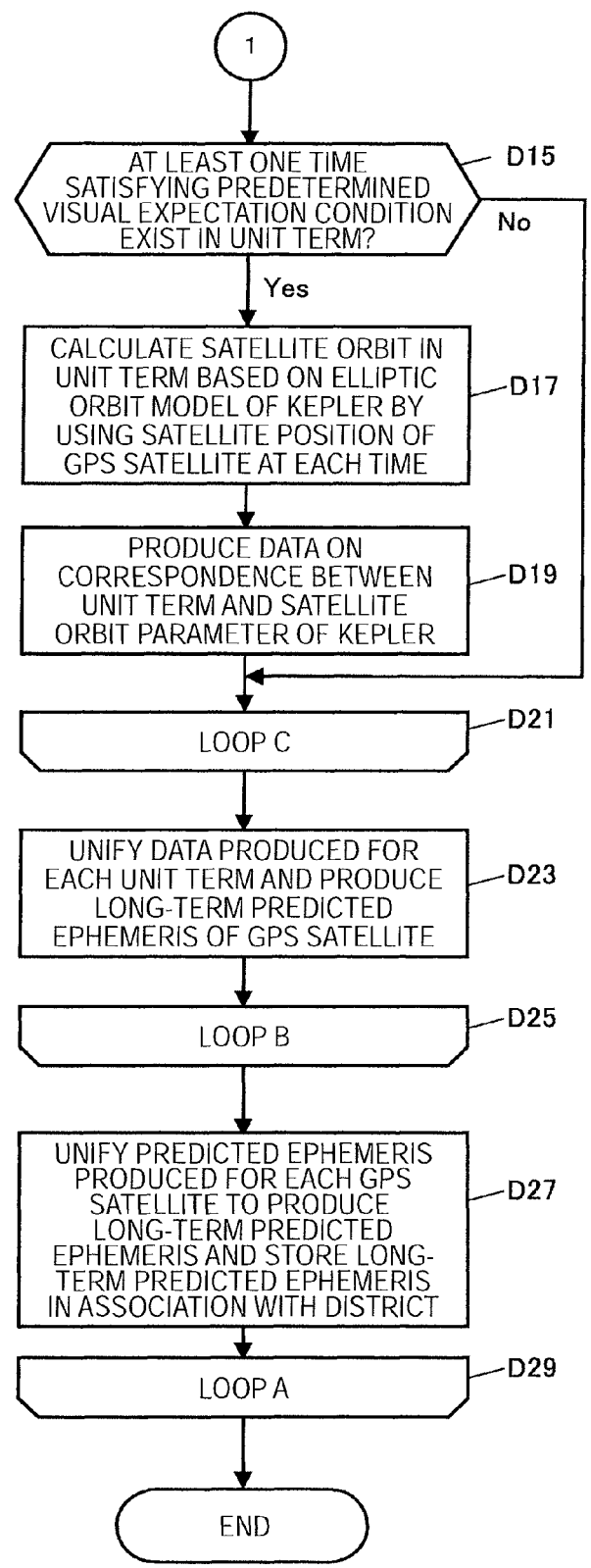
FIG. 18 is a view of a flowchart showing a flow of a second part of the long-term predicted ephemeris producing process of FIG. 17.

FIGS. 17 and 18 are flowcharts showing flow of the long-term predicted ephemeris producing process.

Initially, the CPU 310 clears the long-term predicted ephemeris database 355 stored in the hard disk 350 (step D1), and determines unit terms based on the current date and time (step D3). According to this embodiment, the unit term corresponds to each period of six hours in the time range from the current date and time (generation date and time) until one week later.

Then, the CPU 310 refers to the satellite predicted ephemeris 351 stored in the hard disk 350 and extracts each satellite position of the satellites at each time in the unit terms determined in step D3 (time stored in the satellite predicted ephemeris 351 for every 15 minutes and contained in the corresponding unit term) (step D5). Then, the CPU 310 performs process of loop A for each of the districts 3531 stored in the reference position data 353 of the hard disk 350 (steps D7 through D29).

In loop A, the CPU 310 executes process of loop B for each of the GPS satellites SV (steps D9 through D25). In loop B, the CPU 310 executes process of loop C for each of the unit terms determined in step D3 (steps D1 through D21).

In loop C, the CPU 310 calculates the elevation angle of the corresponding GPS satellite at each time based on the reference position 3533 associated with the corresponding district 3531 of the reference position data 353 and the satellite position of the corresponding GPS satellite at each time of the unit term. Then, the CPU 310 stores the calculated elevation angle in the satellite elevation angle database 357 of the hard disk 350 as the satellite elevation angle data 358 associated with the corresponding district 3581 and the corresponding unit term 3583 (step D13).

Then, the CPU 310 judges whether at least one time satisfying a predetermined visual expectation condition exists or not in the corresponding unit term (step D15). The visual expectation condition is that the elevation angle becomes 0 or larger degrees, for example. When judging that no time satisfying the visual expectation condition exists (step D15; NO), the CPU 310 advances the flow to the subsequent unit term.

When judging that at least one time satisfying the visual expectation condition exists (step D15; YES), the CPU 310 calculates the satellite orbit of the corresponding GPS satellite in the corresponding unit term based on the Kepler elliptic orbit model by using the satellite positions of the corresponding GPS satellite at the respective times (step D17). Then, the CPU 310 produces data showing correspondence between the corresponding unit term and the Kepler satellite orbit parameter (step D19), and shifts to the subsequent unit term.

After executing steps D13 through D19 for all the unit terms, the CPU 310 ends the process of loop C (step D21). After completing the process of loop C, the CPU 310 unifies data produced in step D19 for the respective unit terms to produce long-term predicted ephemeris of the corresponding GPS satellite (step D23). Then, the CPU 310 advances the flow to the subsequent GPS satellite.

After executing steps D11 through D23 for all the GPS satellites, the CPU 310 ends the process of loop B (step D25). After completing the process of loop B, the CPU 310 unifies the long-term predicted ephemeris produced for the respective GPS satellites to create the long-term predicted ephemeris 3563 for all the GPS satellites, and stores the long-term predicted ephemeris data 356 associated with the corresponding district 3561 in the long-term predicted ephemeris database 355 of the hard disk 350 (step D27). Then, the CPU 310 advances the flow to the subsequent district.

After executing steps D9 through D27 for all the districts, the CPU 310 ends the process of loop A (step D29). Then, the CPU 310 ends the process of loop A, and finishes the long-term predicted ephemeris producing process.

Returning to the long-term predicted ephemeris providing process shown in FIG. 16, the CPU 310 having performed the long-term predicted ephemeris producing process judges whether a request signal requesting the long-term predicted ephemeris has been received from the cellular phone 2 or not (step C9). When judging that the request signal has not been received (step C9; NO), the flow returns to step C1.

When judging that the request signal has been received (step C9; YES), the CPU 310 determines the type of received request signal (step C11). When judging that the received request signal is the first request signal (step C11; first request signal), the CPU 310 determines the district corresponding to the use district contained in the first request signal (step C13).

When judging that the received request signal is the second request signal (step C11; second request signal), the CPU 310 determines the district to which the latest measured position contained in the second request signal belongs (step C15).

Then, the CPU 310 extracts the long-term predicted ephemeris 3563 stored in correspondence with the district 3561 determined in step C13 or C15 from the long-term predicted ephemeris database 355 of the hard disk 350 (step C17). The CPU 310 then transmits the extracted long-term predicted ephemeris 3563 to the cellular phone 2 having requested the long-term predicted ephemeris 3563 (step C19), and returns to step C1.

4. Operation and Advantage

According to the positioning system 1, the cellular phone 2 transmits the first request signal containing the use district or the second request signal containing the latest measured position to the server system 3. The server system 3 having received the first request signal transmits a long-term predicted ephemeris for the district corresponding to the use district contained in the first request signal to the cellular phone 2 having requested the long-term predicted ephemeris. The server system 3 having received the second request signal transmits the long-term predicted ephemeris for the district to which the latest measured position contained in the second request signal belongs to the cellular phone 2 having requested the long-term predicted ephemeris. Then, the cellular phone 2 receives the long-term predicted ephemeris from the server system 3 and measures the position by performing the predetermined positioning calculation based on the long-term predicted ephemeris.

The server system 3 periodically performs the process for producing the long-term predicted ephemeris for each of the predetermined districts, and stores the produced long-term predicted ephemeris in the database. More specifically, the server system 3 judges whether the respective GPS satellites are observable or not for each unit term as period of 6 hours in the time range from the generation time until one week later based on the satellite predicted ephemeris received from the external system 4. Then, the server system 3 calculates the satellite orbit of the corresponding GPS satellite in the corresponding unit term based on an approximate Kepler model for each of the unit terms during which the GPS satellite is observable according to judgment, and stores satellite orbit parameters thus calculated as the long-term predicted ephemeris. On the other hand, the server system 3 does not calculate satellite orbit of the corresponding GPS satellite for the unit terms during which the GPS satellite cannot be observed according to judgment, and thus does not produce data for these unit terms.

As should be apparent from this disclosure, satellite orbit data are not produced for all the unit terms of all the GPS satellites, and no data are produced for the unit term during which the GPS satellite cannot be observed from the cellular phone 2. Thus, the amount of data on the long-term predicted ephemeris provided for the cellular phone 2 is efficiently reduced, and the communication cost is lowered. Moreover, the necessity for retaining data not used for measuring positions in the cellular phone 2 is eliminated, and the memory is thus saved.

MODIFIED EXAMPLES

Modified examples will now be explained in view of the similarity between the unmodified embodiment and the modified example, the parts of the modified example that are identical to the parts of the unmodified embodiment will be given the same reference numerals as the parts of the unmodified embodiment. Moreover, the descriptions of the parts and steps of the modified examples that are identical to the parts and steps of the unmodified embodiment may be omitted for the sake of brevity.

5. Modified Example
5-1. Positioning System

While the positioning system 1 including the cellular phone 2 and the server system 3 has been discussed as an example in the previous embodiment, the invention may be applied to electronic devices such as a portable computer, personal digital assistant (PDA), and car navigation system including a positioning device instead of the cellular phone 2, for example.

5-2. Satellite Positioning System

While the GPS as satellite positioning system has been discussed in the embodiments, the invention is applicable to other satellite positioning systems such as WAAS (wide area augmentation system), QZSS (quasi zenith satellite system), GLONASS (global navigation satellite system), and GALILEO.

5-3. Division of Process

A part or all of the process performed by the host CPU 20 may be conducted by the CPU 15. For example, the CPU 15 requests long-term predicted ephemeris from the server system 3 by executing process for requiring long-term predicted ephemeris, and performs a positioning calculation based on the obtained long-term predicted ephemeris. It should be apparent from this disclosure that positioning calculation may be carried out by the CPU 15 in place of the host CPU 20.

5-4. Production and Provision of Long-term Predicted Ephemeris

According to this embodiment, the server system 3 produces long-term predicted ephemeris for all districts at predetermined time intervals (such as once for every four hours), and extracts and transmits a long-term predicted ephemeris for the corresponding district when receiving a request for long-term predicted ephemeris from the cellular phone 2. However, the server system 3 may produce and transmit a long-term predicted ephemeris to the cellular phone 2 at the time when receiving a request for the long-term predicted ephemeris from the cellular phone 2.

In this case, a second long-term predicted ephemeris providing program is stored in the ROM 340 of the server system 3 in place of the long-term predicted ephemeris providing program 341, and a second long-term predicted ephemeris producing program is stored as sub-routine of the second long-term predicted ephemeris providing program. Then, the CPU 310 performs a second long-term predicted ephemeris providing process and second long-term predicted ephemeris producing process according to these programs.

Figure 19:
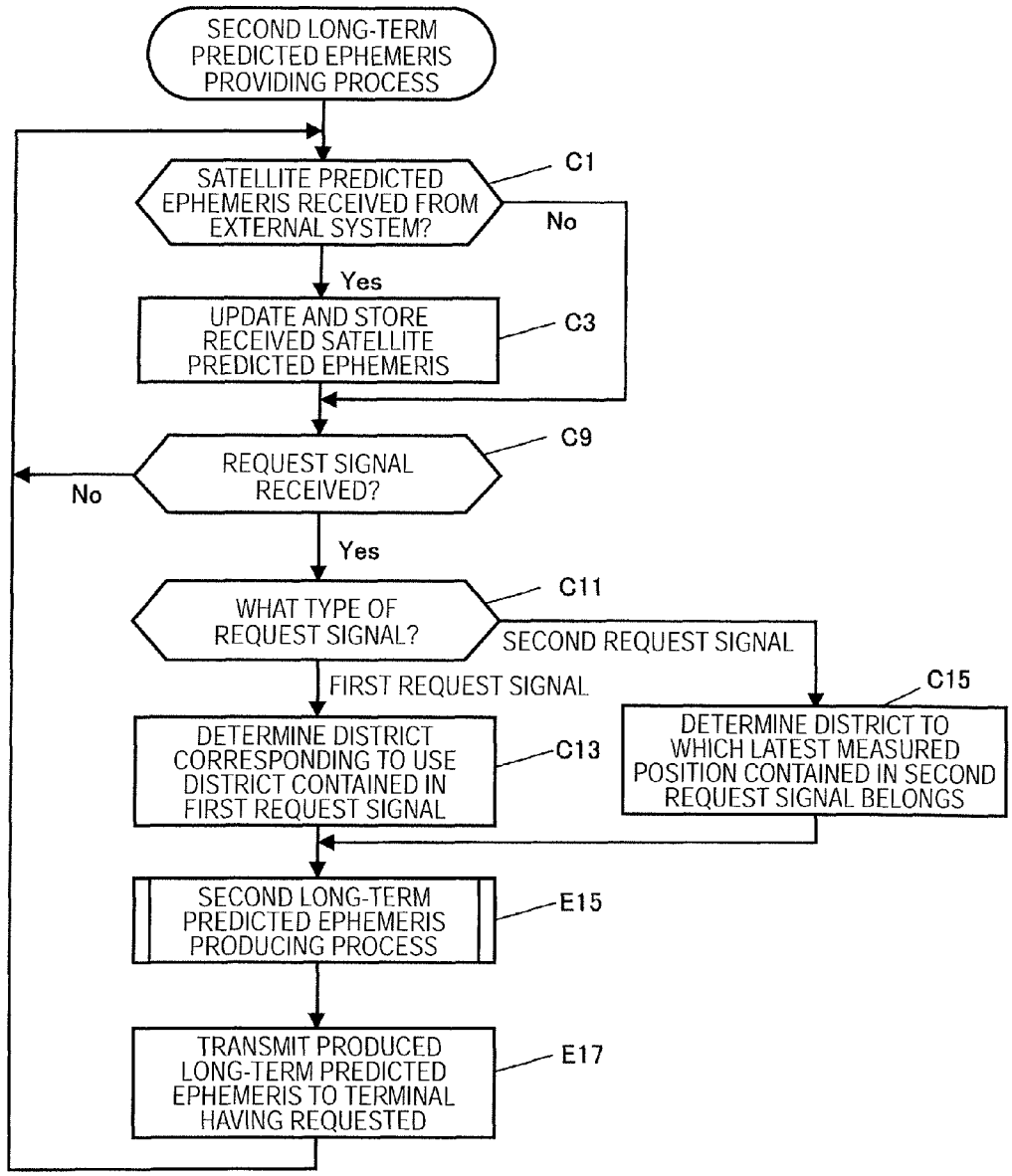
FIG. 19 is a view of a flowchart showing a flow of a second long-term predicted ephemeris providing process of the positioning system.

FIG. 19 is a flowchart showing a flow of the second long-term predicted ephemeris providing process. Explanations are omitted for the steps unchanged from the long-term predicted ephemeris providing process shown in FIG. 16, and the parts and steps different from the long-term predicted ephemeris providing process are discussed herein.

According to the second long-term predicted ephemeris providing process, the CPU 310 having determined the district in step C13 or C15 reads the second long-term predicted ephemeris producing program stored in the ROM 340 and executes this program to carry out the second long-term predicted ephemeris producing process (step E15). Then, the CPU 310 transmits the produced long-term predicted ephemeris to the cellular phone 2 having requested the long-term predicted ephemeris (step E17), and returns to step C1.

Figure 20:
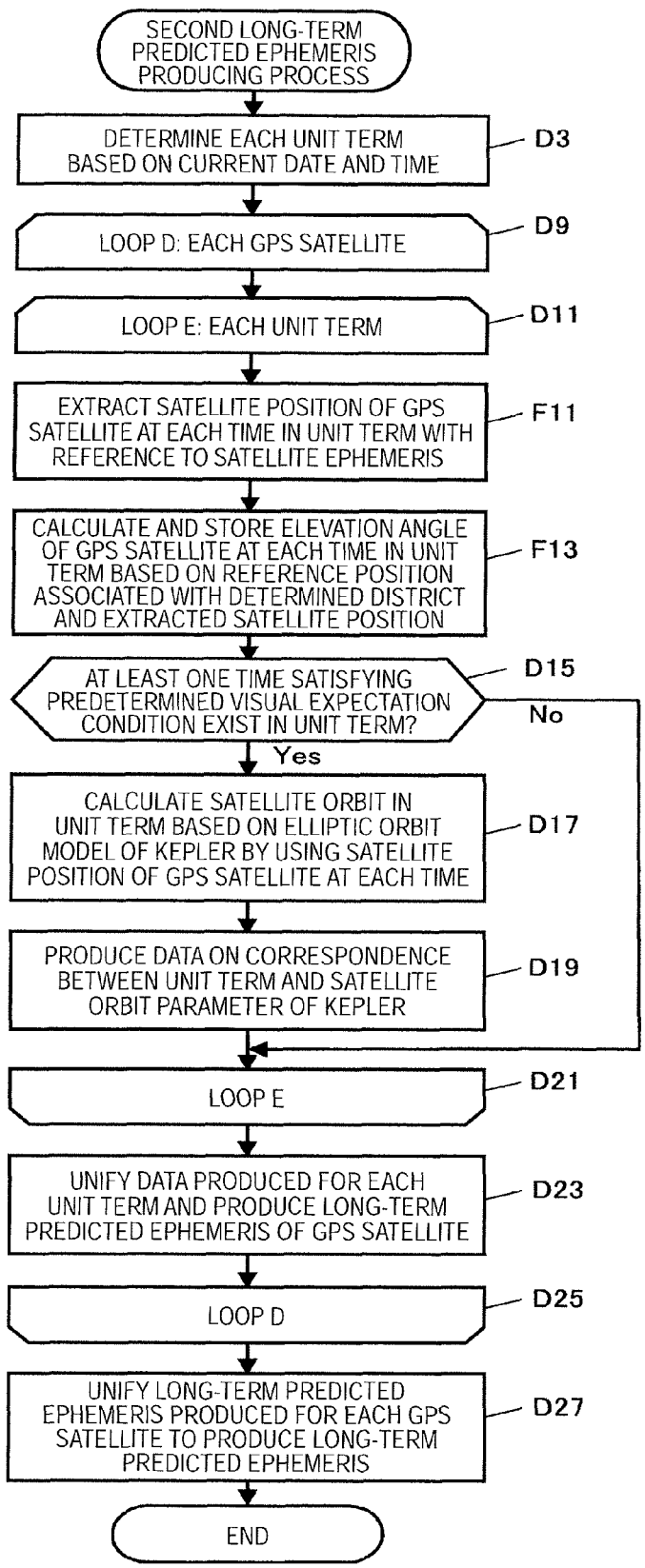
FIG. 20 is a view of a flowchart showing a flow of a second long-term predicted ephemeris producing process of the second long-term predicted ephemeris providing process.

FIG. 20 is a flowchart showing a flow of the second long-term predicted ephemeris producing process. Explanations are omitted for the steps unchanged from the long-term predicted ephemeris producing process shown in FIGS. 17 and 18, and the parts and steps different from the long-term predicted ephemeris producing process are discussed herein.

The CPU 310 having determined the unit term based on the current date and time (step D3) performs a process of loop D for the respective GPS satellites (step D9 through D25). Then, the CPU 310 executes a process of loop E for each of the unit terms determined in step D3 (steps D11 through D21).

In loop E, the CPU 310 refers to the satellite predicted ephemeris 351 stored in the hard disk 350 and extracts each satellite position of the corresponding satellite at each time in the corresponding unit term (time stored in the satellite predicted ephemeris 351 for every 15 minutes and contained in the corresponding unit term) (step F11).

Then, the CPU 310 refers to the reference position data 353 of the hard disk 350, calculates the elevation angle of the corresponding GPS satellite at each time of the corresponding unit term based on the reference position 3533 associated with the district determined in step C13 or C15 and the satellite position extracted in step F11, and stores the calculated elevation angle in the satellite elevation angle database 357 of the hard disk 350 (step F13). The CPU 310 then advances the flow to step D15.

It is possible to produce a long-term predicted ephemeris by determining the GPS satellite that is observable from the existing location of the cellular phone 2 instead of determining the GPS satellite that is observable from the reference position associated with the district in advance. In this case, the elevation angle of each GPS satellite at each time of the respective unit terms is calculated based on the latest measured position contained in the second request signal and the satellite position extracted from the satellite predicted ephemeris when the second request signal is received from the cellular phone 2. Then, the visual expectation condition is determined based on the calculated elevation angle.

5-5. Long-term Predicted Ephemeris Providing Area

According to this embodiment, a long-term predicted ephemeris has been produced and provided for the respective states of the U.S. as the long-term predicted ephemeris providing area. However, the providing area may be suitably determined. For example, the providing area may be respective countries, or either the northern hemisphere or the southern hemisphere.

Figure 21:
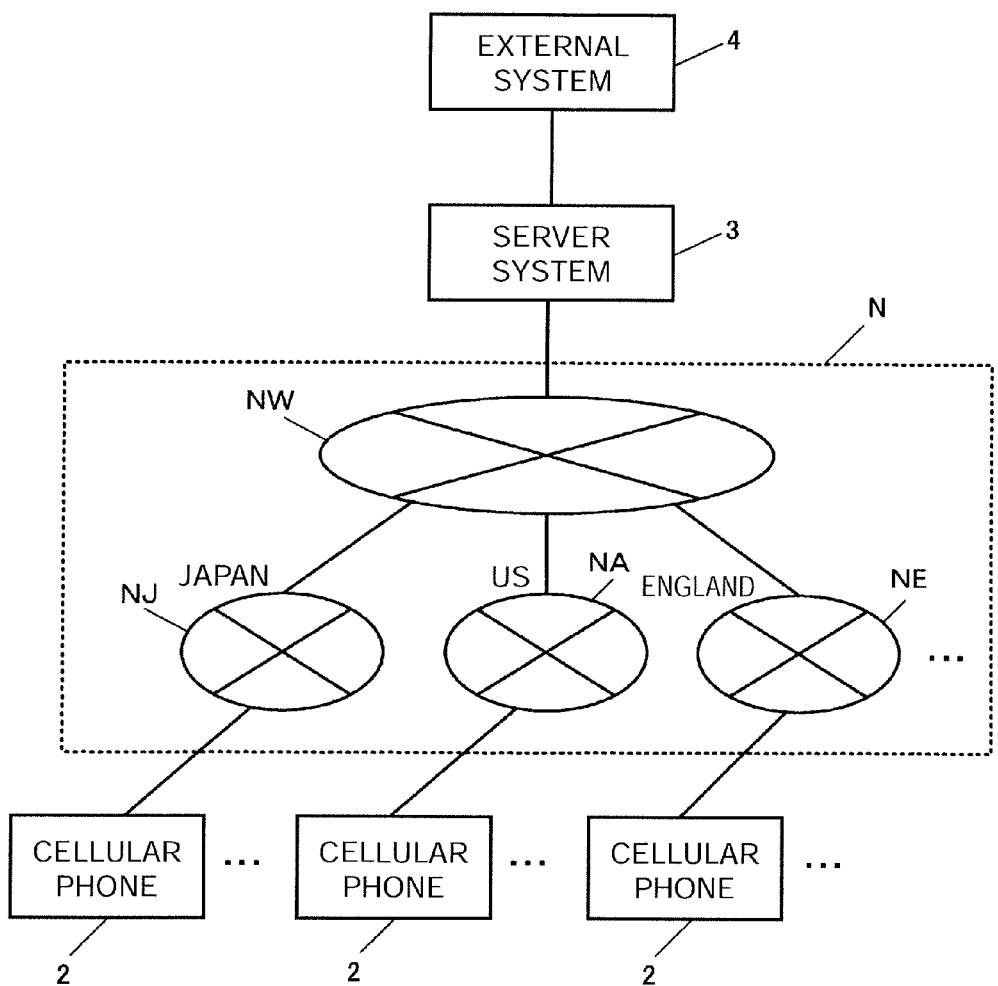
FIG. 21 illustrates a general structure of a positioning system according to a modified example of the preferred embodiment.

FIG. 21 shows an example of a positioning system having the providing area of the respective countries.

According to this positioning system, the respective cellular phones 2 are connected with the server system 3 via a network N constituted by domestic cellular phone networks (such as NJ of Japan, NA of U.S., and NE of England), and network NW for connecting the respective countries in the world.

The CPU 310 of the server system 3 produces a long-term predicted ephemeris for all of the countries in advance, and stores the produced long-term predicted ephemeris in the long-term predicted ephemeris database 355 of the hard disk 350. In this case, the long-term predicted ephemeris is created according to the long-term predicted ephemeris producing process discussed with reference to FIGS. 17 and 18 based on the judgment whether the respective GPS satellites are observable in each unit term from the reference positions predetermined in advance for each of the countries.

Then, the CPU 310 judges which cellular phone network of the respective countries is used to transmit the request signal when receiving the request signal requesting long-term predicted ephemeris from the cellular phone 2. Then, the CPU 310 extracts the long-term predicted ephemeris for the country corresponding to the determined cellular phone network from the long-term predicted ephemeris database 355, and transmits the extracted long-term predicted ephemeris to the cellular phone 2 having requested the long-term predicted ephemeris. For example, when judging that the request signal has been transmitted via the cellular phone network of Japan, the server system 3 transmits the long-term predicted ephemeris corresponding to Japan to the cellular phone 2 having requested the long-term predicted ephemeris.

However, when the user registers a plurality of countries as use districts of the cellular phone 2, the server system 3 transmits each long-term predicted ephemeris corresponding to the plural registered countries. For example, when the user is a businessman reciprocating between Japan and the U.S. or a tourist planning a trip from Japan to the U.S. and registers both "Japan" and "U.S." as use districts, the server system 3 transmits both the long-term predicted ephemerides corresponding to Japan and the U.S. to the cellular phone 2.

In this case, long-term predicted ephemerides may be produced and transmitted to the cellular phone 2 at the time when receiving the request signal requesting the long-term predicted ephemerides from the cellular phone 2 instead of producing the long-term predicted ephemerides in advance. More specifically, the CPU 310 judges which cellular phone network in the respective countries is used to transmit the request signal when receiving the request signal requesting long-term predicted ephemeris from the cellular phone 2. Then, the CPU 310 performs the process to produce the long-term predicted ephemeris for the country corresponding to the determined cellular phone network, and transmits the produced long-term predicted ephemeris to the cellular phone 2 having requested the long-term predicted ephemeris.

5-6. Approximate Model of Satellite Orbit

According to this embodiment, satellite orbits of the GPS satellites have been calculated using an approximate Kepler model. However, the satellite orbits may be calculated based on approximate models such as Lagrange, Neville, and Spline. More specifically, in these cases, the satellite orbits of the GPS satellites are approximated by obtaining the interpolation polynomial based on interpolation technology such as Lagrange, Neville, and Spline methods setting sample points at the satellite positions stored in the satellite predicted ephemeris for the respective GPS satellites.

The amount of data can be more greatly reduced by using long-term predicted ephemeris based on parameters of satellite orbits calculated according to the approximate model discussed above than by producing long-term predicted ephemeris based on data on satellite positions at all times.

5-7. Prediction Period

According to this embodiment, long-term predicted ephemeris has been produced for the prediction period from the reference of long-term predicted ephemeris generation date and time until one week later. However, the prediction period may be a period longer than one week (such as two weeks), or a period shorter than one week (such as three days). The effective period of ephemeris as navigation data transmitted from GPS satellite is generally about four hours. Long-term ephemeris may have any effective period as long as the effective period is at least longer than the period of ephemeris as navigation data transmitted from GPS satellite.

5-8. Unit Term

According to this embodiment, the unit term has been a period of six hours as each equal division of the prediction period of long-term predicted ephemeris. However, the unit term may be a period of four hours as each equal division of the prediction period, for example, or may be suitably determined.

5-9. Determination of District

According to this embodiment, the district to which the latest measured position belongs is determined by the server system 3. However, this determination may be made by the cellular phone 2. More specifically, when judging that the use district register command operation has not been performed in step B5 of the initial positioning speed increase process shown in FIG. 7 (step B5; NO), the host CPU 20 determines the district to which the latest measured position 805 stored in the flash ROM 80 belongs. Then, the host CPU 20 transmits a request signal containing request for the determined district to the server system 3. In this case, the server system 3 transmits the long-term predicted ephemeris corresponding to the district contained in the received request signal to the cellular phone 2 having requested the long-term predicted ephemeris.

5-10. Visual expectation condition

According to this embodiment, the visual expectation condition has been that "elevation angle of satellite becomes 0 or larger degrees." However, the visual expectation condition may be suitably determined. For example, the visual expectation condition may be set at a more severe condition such as "15 or larger degrees of elevation angle."

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A method for providing long-term ephemeris of a positioning satellite, the method comprising:
    determining whether or not a positioning satellite is in view from a reference position in each of plural unit time, a predicted period of the long-term predicted ephemeris including the plural unit time, the predicted period being a predetermined period from generation of the long-term predicted ephemeris; and
    providing the long-term predicted ephemeris including satellite orbit data of a unit time that the positioning satellite is in view from the reference position and not including satellite orbit data of a unit time that the positioning satellite is not in view from the reference position.

2. The method according to claim 1, wherein
    the reference position is at least one of a position of the positioning device, a registered district, and a predetermined district for which the long-term predicted ephemeris is to be provided.

3. The method according to claim 1, further comprising
    obtaining time series data of predicted positions for the positioning satellite;
    extracting data of a unit time that the positioning satellite is in view from the reference position, from the obtained time series data; and
    generating the long-term predicted ephemeris based on the data.

4. The method according to claim 3, wherein
    the generating the long-term predicted ephemeris includes generating parameters of a predetermined approximate model expression based on the data.

5. The method according to claim 1, wherein
    the determining whether or not the positioning satellite is in view includes determining that the positioning satellite is in view from the reference position in a unit time when an elevation angle of the positioning satellite is more than predetermined value in the unit term.

6. The method according to claim 1, wherein
    the predicted period is at least one day.

7. A server for providing long-term ephemeris of a positioning satellite, the method comprising:
    a determining unit that determines whether or not a positioning satellite is in view from a reference position in each of plural unit time, a predicted period of the long-term predicted ephemeris including the plural unit time, the predicted period being a predetermined period from generation of the long-term predicted ephemeris; and
    a transmitting unit that transmits the long-term predicted ephemeris including satellite orbit data of a unit time that the positioning satellite is in view from the reference position and not including satellite orbit data of a unit time that the positioning satellite is not in view from the reference position.

8. A positioning system comprising:
    a positioning device that measures a position using long-term predicted ephemeris; and
    a server that provides the long-term predicted ephemeris to the positioning device,
    the positioning device includes
        a transmitting unit that transmits a reference position information to the server,
        a receiving unit that receives the long-term predicted ephemeris from the server, and
        a positioning unit that measures the position using the long-term predicted ephemeris,
    the server includes
        a determining unit that determines whether or not a positioning satellite is in view from a reference position in each of plural unit time, a predicted period of the long-term predicted ephemeris including the plural unit time, the predicted period being a predetermined period from generation of the long-term predicted ephemeris, and
        a transmitting unit that transmits the long-term predicted ephemeris including satellite orbit data of a unit time that the positioning satellite is in view from the reference position and not including satellite orbit data of a unit time that the positioning satellite is not in view from the reference position.

* * * * *